UNITED STATES PATENT OFFICE.

KARL JEDLICKA AND ARNOLD SCHEDLER, OF BASLE, SWITZERLAND, ASSIGNORS TO THE FIRM OF SOCIETY OF CHEMICAL INDUSTRY IN BASLE, OF BASLE, SWITZERLAND.

ORANGE TETRAZO DYE AND PROCESS OF MAKING SAME.

SPECIFICATION forming part of Letters Patent No. 763,761, dated June 28, 1904.

Application filed January 7, 1904. Serial No. 188,127. (No specimens.)

*To all whom it may concern:*

Be it known that we, KARL JEDLICKA and ARNOLD SCHEDLER, both chemists and doctors of philosophy, citizens of the Swiss Republic, and residents of Basle, Switzerland, have invented new and useful Improvements in the Manufacture of Orange Tetrazo Dyestuffs, of which the following is a full, clear, and complete specification.

This invention relates to the manufacture of valuable new tetrazo dyestuffs by the combination of one molecule of the tetrazo derivative of an azoöxyamin of the formula

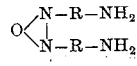

(wherein R designates an alphyl radical, as $C_6H_4, C_6H_3.CH_3, C_6H_2(CH_3)_2$, &c.) with two molecules of phenolic compounds, of which one at least is a sulfo derivative of the 2.5-amidonaphthol—as, for instance, the amidonaphtholmonosulfonic acid ($NH_2:OH:SO_3H = 2:5:7$) or the 2.5.1.7-amidonaphtholdisulfonic acid ($NH_2:OH:SO_3H = 2:5:1:7$.) These new dyestuffs correspond to the general formula

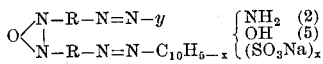

R having the same significance as in the preceding formula and $y$ representing a phenolic compound—as, for instance, the 2.5.7-amidonaphtholmonosulfonic acid, the 2.5.1.7-amidonaphtholdisulfonic acid, a sulfo derivative of alphanaphthol, a sulfo derivative of betanaphthol, the salicylic acid, an oxynaphthoic acid, &c. They constitute red to red-brown powders, which dissolve in water with an orange to orange-red coloration and dye unmordanted cotton in a saline bath orange to orange-red shades. By diazotizing these new dyestuffs on the fiber and developing subsequently with betanaphthol valuable bright bordeaux-red tints highly fast to washing are obtained.

The following examples illustrate the manufacture of the new dyestuffs:

Example I: 22.8 kilos of meta-meta-diamidoazoöxybenzene (azoöxyanilin obtained by reducing metanitranilin in alkaline medium according to the process of Letters Patent No. 380,927, dated April 10, 1888) are dissolved in about four hundred kilos of water containing fifty kilos of hydrochloric acid of thirty-per-cent. strength and diazotized with fourteen kilos of sodium nitrite, care being taken to cool by ice. The tetrazo solution thus obtained is introduced into a solution of forty-eight kilos of 2.5.7-amidonaphtholsulfonic acid in about four hundred kilos of water containing an excess of sodium carbonate, care being taken to stir the latter solution. Combination occurs at once. The mixture is heated to about 80° centigrade, a little common salt is added, and the dyestuff filtered, pressed, and dried. It forms in a dry state a brown-red powder soluble in water to an orange solution. In hot alcohol it is scarcely soluble. It dissolves in concentrated sulfuric acid of 66° Baumé with a bluish-red coloration. It dyes cotton directly without a mordant red-orange. By diazotization on the fiber and development with betanaphthol the tint passes to a bright bordeaux, highly fast to washing. If in this example for the 2.5.7-amidonaphtholsulfonic acid 2.5.1.7-amidonaphtholdisulfonic acid is substituted, the dyestuff produced is hardly distinguishable from that of the example in the tints it produces directly or after development.

Example II: 25.6 kilos of azoöxytoluidin (made according to the Letters Patent No. 380,927, dated April 10, 1888, from paranitroörthotoluidin) are tetrazotized in the usual manner, and the tetrazo solution obtained is mixed with a solution of fourteen kilos of salicylic acid in water strongly charged with sodium carbonate. When the intermediate product has been formed, there is added a neutral solution of twenty-four kilos of 2.5.7-amidonaphtholsulfonic acid and the dyestuff is isolated in the usual manner.

Instead of salicylic acid, used in Example II, may be used other phenolic compounds, such as cresotinic acid, alphanaphtholsulfonic acids, betanaphtholsulfonic acids, oxynaphthoic acid, and the like.

What we claim is—

1. The herein-described process for the manufacture of tetrazo dyestuffs which consists in combining one molecule of the tetrazo derivative of an azoöxyamin corresponding to the formula

wherein R stands for an alphyl radical with two molecules of phenolic compounds, of which one at least is a sulfo derivative of 2.5-amidonaphthol.

2. The described process for the manufacture of tetrazo dyestuffs, which consists in combining one molecule of the tetrazo derivative of an azoöxyamin corresponding to the formula

(in which R stands for an alphyl radical,) with two molecules of a sulfo derivative of 2.5-amidonaphthol.

3. The described process for the manufacture of tetrazo dyestuffs, which consists in combining one molecule of the tetrazo derivative of an azoöxyamin corresponding to the formula $$O\!\!<_{N-R-NH_2}^{N-R-NH_2}$$

(wherein R stands for an alphyl radical,) with two molecules of the 2.5.7-amidonaphtholsulfonic acid.

4. The herein-described new tetrazo dyestuffs which correspond to the formula

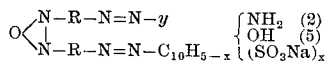

(R signifying an alphyl radical and $y$ a phenolic compound) and which are red to reddish-brown powders soluble in water with yellowish-red coloration, dye unmordanted cotton orange to orange-red shades which, when further diazotized on the fiber and developed with betanaphthol yield valuable bordeaux-red tints fast to washing.

5. The herein-described new tetrazo dyestuff corresponding to the formula

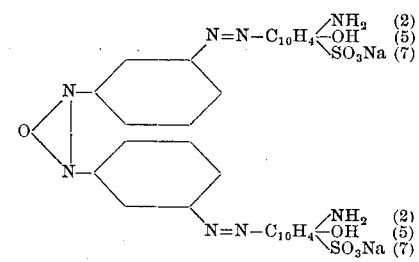

which is in dry state a reddish-brown powder, soluble in water with an orange color, scarcely soluble in hot alcohol, but soluble in concentrated sulfuric acid with a bluish-red color, dyes unmordanted cotton orange shades, which, when further diazotized on the fiber and developed with betanaphthol, yield bright bordeaux-red tints, fast to washing.

In witness whereof we have hereunto signed our names, this 19th day of December, 1903, in the presence of two subscribing witnesses.

KARL JEDLICKA.
ARNOLD SCHEDLER.

Witnesses:
AMAND RITTER,
ALBERT GRAETER.